July 21, 1931.  R. E. DE WALT  1,815,037
SAWING MACHINE
Filed April 3, 1929  2 Sheets-Sheet 1

Raymond E. De Walt, Inventor
By his Attorney Frank D. Kent

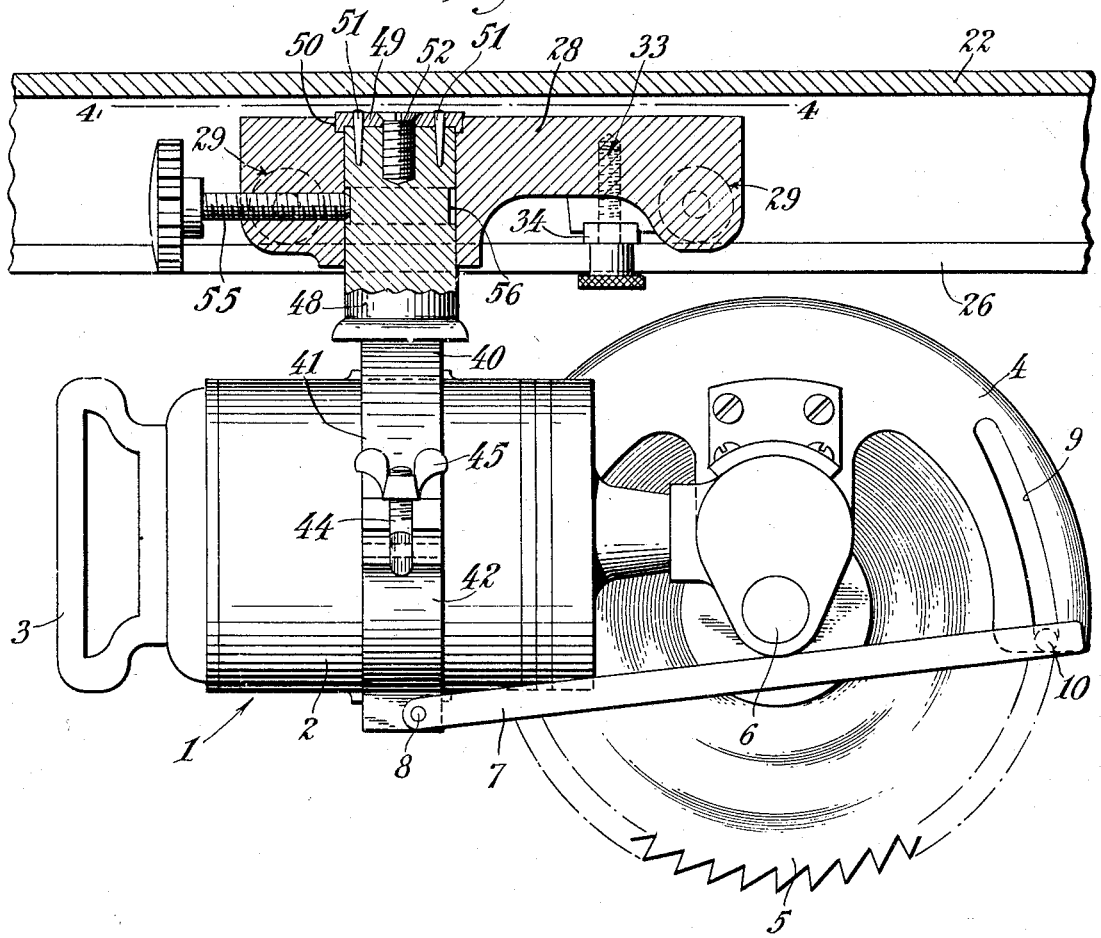
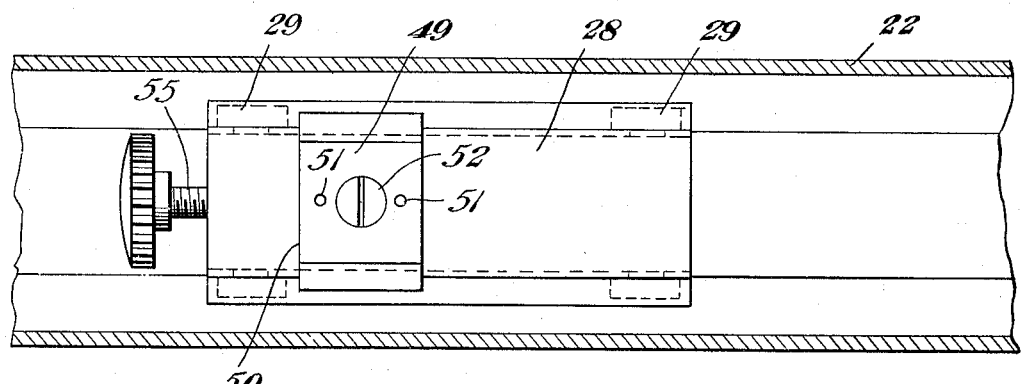

Patented July 21, 1931

1,815,037

UNITED STATES PATENT OFFICE

RAYMOND E. DE WALT, OF LEOLA, PENNSYLVANIA, ASSIGNOR TO DE WALT PRODUCTS CORPORATION, OF LEOLA, PENNSYLVANIA, A CORPORATION OF PENNSYLVANIA

SAWING MACHINE

Application filed April 3, 1929. Serial No. 352,150.

My invention relates to sawing machines or mechanisms, and especially to an arrangement for detachable mounting of a power saw of the "hand" or portable type as a part of a complete machine for use in woodworking shop equipment.

Portable saws of the type referred to include a motor and a circular saw mounted and connected as an operative unit with the motor, and available for many woodworking operations requiring portability and hand support while performing such operations. The present invention aims to make such portable saws also available as a part of a complete machine usable in a fixed location, and such a machine including the portable saw I refer to for convenience as a sawing machine. The portable saw may easily be detached from the machine at any time for "hand" or portable use.

An important feature of the invention is the mounting of the portable saw in the machine in such manner that it may be adjusted in various positions in accordance with the requirements of the work in hand.

The characteristics and advantages of the invention are further sufficiently explained in connection with the following detail description of the accompanying drawings, which show one representative embodiment. After considering this example, skilled persons will understand that many variations may be made without departing from the principles disclosed, and I contemplate the employment of any structures that are properly within the scope of the appended claims.

In the drawings:

Fig. 3 is an enlarged elevation from the view-point of Fig. 1, showing the arm and saw carriage in section.

Fig. 4 is a plan view partly in section taken on the line 4—4 of Figure 3.

Figure 1:
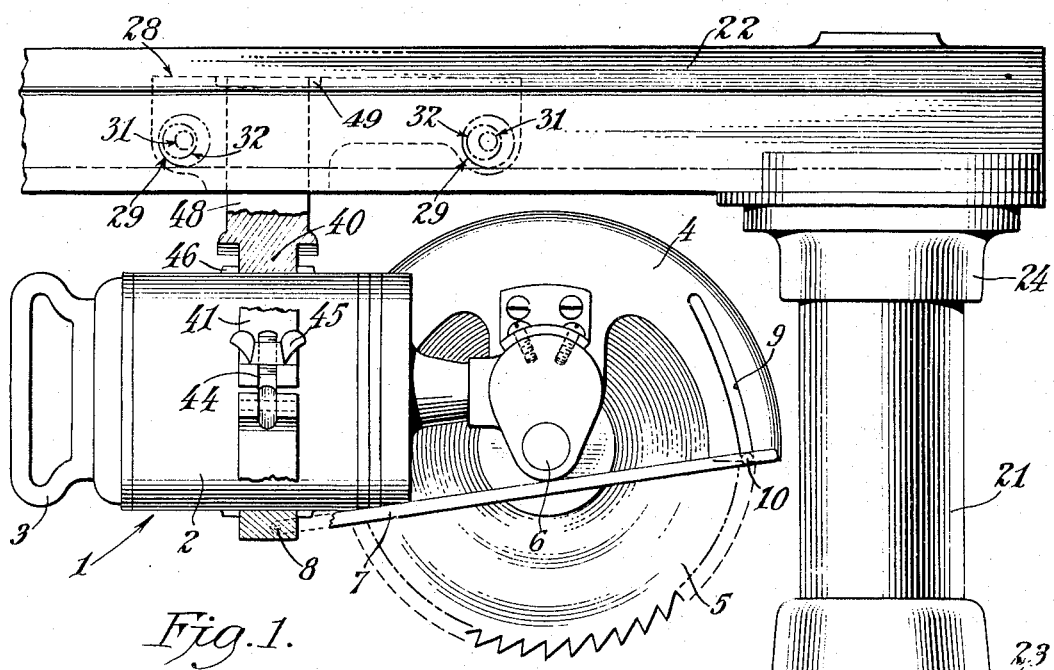
Fig. 1 is a side elevation of a machine embodying the invention in one form.
Figure 2:
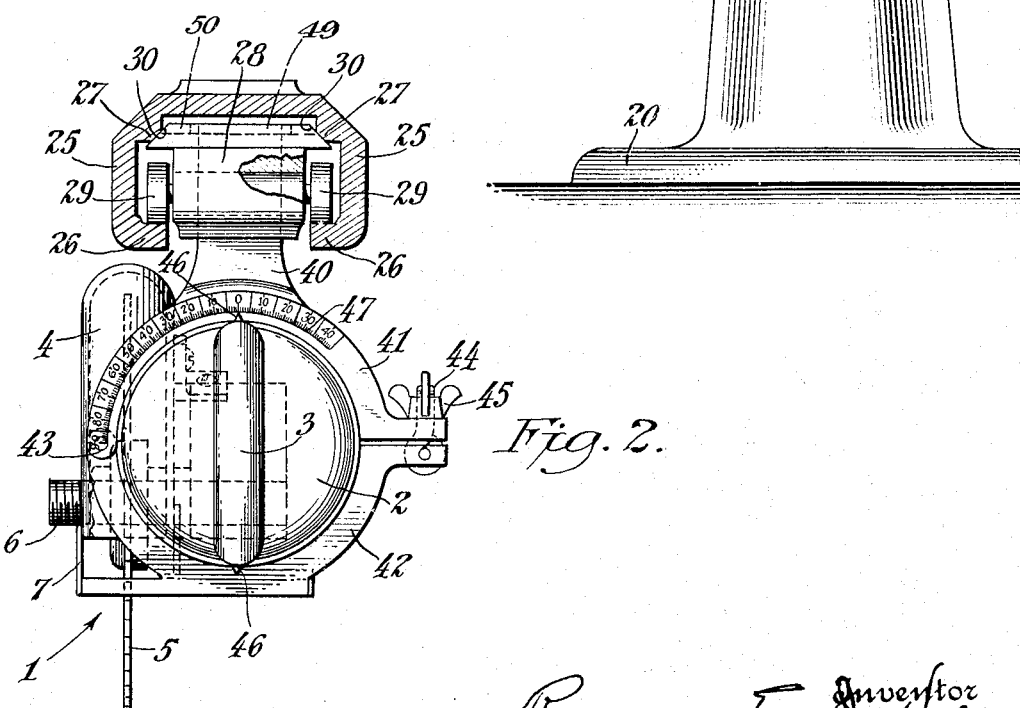
Fig. 2 is a left-side elevation, showing the arm in section.

Figs. 1 and 2 show a portable power saw 1 of one suitable type, which includes a cylindrical motor casing 2 having a handle 3, and a guard 4 enclosing the upper margin of a circular saw 5 which is mounted on a shaft 6 with bearings connected to the carriage and motor casing and with suitable gearing (not shown) connecting the motor shaft to the saw shaft. Such saws also usually have a base or guide plate 7 pivotally connected as at 8 and adjustable by means of a slot 9 in guard 4 and pin or bolt connection 10. The plate 7 serves to support or guide the saw in different adjustable positions in relation to the work when used as a hand saw, and other adjustments may also be provided as understood in the art.

To make such portable saws available for use as a part of a complete or permanent woodworking machine I provide a base 20 for mounting on a table or work bench, a column 21 and an arm 22 extending horizontally from the top of the column. In some cases the column may revolve in the base or a sleeve 23 extending therefrom; otherwise, the column may be fixed in the base and the arm or arm support 24 may revolve on the column. The arm is of channel cross section including side walls or webs 25 internally channeled to provide rails 26, and angular or beveled slideways 27. A saw carriage 28 is mounted for longitudinal movement on the arm, and for this purpose has rollers 29 running on rails 26 and also has upper diagonal slide faces 30 to cooperate with the slideways 27. The roll shafts 31, Fig. 1, may be mounted in eccentrics, or may have eccentric portions 32, with suitable locking means so that by rotating the shafts or eccentrics the upper slideways may be held in proper close sliding contact and the carriage caused to run true in the arm guideways without tilting or other undesired movement. The slide may be locked in the desired position longitudinally of the arm by a screw 33 engaging in the slide and having a member 34 engaging the rails, or other suitable clamping means may be provided.

A saw or motor support 40 is mounted in the carriage, depending therefrom, and having at its lower end the saw or motor supporting or clamping means proper consisting of an upper half clamp or ring 41 which may be integral with the support 40, and a lower half clamp or ring 42 hingedly connected to the clamping member 41 at 43, and provided with fastening means such as a swing bolt 44 and wing nut 45. The split clamp or ring fits the cylindrical motor casing and thus the hand saw as a unit may be easily and quickly mounted in the machine or removed therefrom when wanted for portable use. The clamping arrangement also provides for rotation of the portable saw as a unit about its longitudinal axis in order to tilt the saw on such a horizontal axis for different classes of work. As a guide for this adjustment the motor casing may be provided with pointers 46 in either upper or lower positions or both, and also located at one or both sides of the clamping ring, and cooperating with a scale 47 provided on one or both faces of either or both of the clamping ring members.

Provision is also made for adjustment of the saw about a vertical axis in relation to the carriage. For this purpose the cylindrical upper part 48 of the support 40 is revolubly mounted in the carriage and has secured to its upper end a square or polygonal head 49 fitting in a complementary socket formation 50 formed by cutting a channel across the top of the carriage in the upper surface of the carriage. The head may be secured to the upper end of the support as by taper pins 51 and a screw 52. The saw may be adjusted to different angular positions about the vertical axis by raising it, whereupon the head 49 is freed from its socket, and then rotating the saw structure and lowering it to reengage the head 49 in socket 50 in another position. The support may then be locked as by a screw 55 engaging in an annular channel 56 in the support portion 49.

I thus provide for placing the saw in any convenient or necessary working position by the swinging of arm 22, longitudinal movement of the saw carriage thereof, adjustment of support 40 about its vertical axis, and rotation of the saw structure on a horizontal axis in clamp 41 and 42.

I claim:

1. In a mounting for motor driven portable circular saws, an arm, a carriage mounted on said arm to travel therealong, said carriage having a vertical cylindrical opening extending therethrough and provided with an enlarged polygonal upper end, a motor clamp adapted to fit around the saw motor and secure the same in desired position, a shank extending upwardly from said clamp and having a cylindrical portion rotatably mounted in said opening, and a polygonal plate removably secured to the upper end of the shank in fixed relation thereto and forming a head on said shank normally seated in the polygonal upper end of the opening, said shank being of sufficient length to permit lifting of the head from its seat to allow rotation on a vertical axis of the clamp.

2. In a mounting for motor driven portable circular saws, an arm, a carriage mounted on said arm to travel therealong, said carriage having a vertical cylindrical opening extending therethrough and provided with an enlarged polygonal upper end, a motor clamp adapted to fit around the saw motor and secure the same in desired position, a shank extending upwardly from said clamp and having a cylindrical portion rotatably mounted in said opening, a polygonal plate removably secured to the upper end of the shank in fixed relation thereto and forming a head on said shank normally seated in the polygonal upper end of the opening, said shank being of sufficient length to permit lifting of the head from its seat to allow rotation on a vertical axis of the clamp, and releasable means for holding the shank against vertical movement.

In testimony whereof I affix my signature.

RAYMOND E. DE WALT.